(12) United States Patent
Ma et al.

(10) Patent No.: US 11,943,345 B2
(45) Date of Patent: Mar. 26, 2024

(54) KEY MANAGEMENT METHOD AND RELATED DEVICE

(71) Applicant: INSPUR SUZHOU INTELLIGENT TECHNOLOGY CO., LTD., Jiangsu (CN)

(72) Inventors: Fuqiang Ma, Jiangsu (CN); Jin Wang, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/036,388

(22) PCT Filed: Nov. 30, 2021

(86) PCT No.: PCT/CN2021/134331
§ 371 (c)(1),
(2) Date: May 10, 2023

(87) PCT Pub. No.: WO2022/148182
PCT Pub. Date: Jul. 14, 2022

(65) Prior Publication Data
US 2023/0308269 A1 Sep. 28, 2023

(30) Foreign Application Priority Data
Jan. 11, 2021 (CN) .......................... 202110034124.1

(51) Int. Cl.
*H04L 9/08* (2006.01)
*H04L 9/40* (2022.01)

(52) U.S. Cl.
CPC .......... *H04L 9/0861* (2013.01); *H04L 9/0819* (2013.01); *H04L 9/085* (2013.01); *H04L 63/105* (2013.01); *H04L 63/20* (2013.01)

(58) Field of Classification Search
CPC .......................... H04L 63/0853; H04L 63/102
(Continued)

(56) References Cited

U.S. PATENT DOCUMENTS 9,774,577 B2 * 9/2017 Lokamathe ........... H04L 63/062
2017/0331832 A1 11/2017 Lander et al.
2021/0374265 A1 * 12/2021 Gigov ................. H04L 63/0853

FOREIGN PATENT DOCUMENTS

CN 103327002 A 9/2013
CN 107426162 A 12/2017
(Continued)

*Primary Examiner* — Anthony D Brown
(74) *Attorney, Agent, or Firm* — IPro, PLLC

(57) ABSTRACT

A key management method and a related device are provided. The method includes: receiving key generation request information; generating attribute access policy information on the basis of the key generation request information, the attribute access policy information being an attribute set for encrypting a data key; encrypting the data key on the basis of the attribute set for encrypting the data key; receiving key acquisition request information; on the basis of the attribute set for encrypting the data key, verifying whether attribute information of the key acquisition request information is included in the attribute set for encrypting the data key; and in response to the attribute information of the key acquisition request information being included in the attribute set for encrypting the data key, acquiring a destination data key on the basis of the attribute information of the key acquisition request information.

17 Claims, 3 Drawing Sheets

(58) Field of Classification Search
USPC .............................................................. 726/4
See application file for complete search history.

(56) References Cited

FOREIGN PATENT DOCUMENTS

| | | |
|---|---|---|
| CN | 109711184 A | 5/2019 |
| CN | 111064701 A | 4/2020 |
| CN | 111783075 A | 10/2020 |
| CN | 111800440 A | 10/2020 |
| CN | 112887273 A | 6/2021 |
| JP | 2009187140 A | 8/2009 |

* cited by examiner

KEY MANAGEMENT METHOD AND RELATED DEVICE

The present application claims the priority of the Chinese patent application filed on Jan. 11, 2021 before the Chinese Patent Office with the application number of 202110034124.1 and the title of "key management method and related device", which is incorporated herein in its entirety by reference.

FIELD

The embodiments of the present application relate to the technical field of network security, and in particular, to a key management method and a related device.

BACKGROUND

In a cloud computing environment, users no longer directly own hardware resources of the infrastructure, but directly use services in the cloud computing environment, that is, users cannot directly control the hardware resources. Therefore, in the cloud computing environment, user data security is becoming more and more prominent. In order to ensure the security of data transmission, data storage, user access, business operations, and the like in the cloud computing environment, cryptography, as a core technology to ensure the security of cloud computing platforms, is playing an increasingly important role in the cloud computing environment. A key management system (KMS) related to cryptography is the basis for ensuring the security of cloud computing platforms, providing services such as safe custody of keys and cryptographic operations. Through the key management system, users may focus more on business functions such as data encryption and decryption, data transmission, and electronic signature in the cloud computing environment, without spending a lot of money to ensure the security of their own keys. With the rapid development of cloud computing systems, key management systems are widely used. The key is the core of the entire key management system. Once the key is leaked or the key management system is compromised, data transmission, data storage, user access, and business operations in the cloud computing environment will all be subject to security threats.

Most of the existing key management systems are on the basis of access control policies of RBAC, which cannot effectively realize fine-grained key generation and usage. The access control policies of RBAC are divided into core RBAC, hierarchical RBAC, static separation of duties RBAC, and dynamic separation of duties RBAC. However, the current four access controls of RBAC belong to coarse-grained access control, which can only control access requests from one type of users, but cannot effectively implement access control for each key.

SUMMARY

The purpose of the embodiments of the present application is to provide a key management method and a related device, which solve the technical problem in the prior art that access control cannot be implemented for each key.

In a first aspect, the embodiments of the present application provide a key management method, which adopts a three-level access control verification policy; according to the above key management method, a user is subjected to authority verification step by step, including identity verification, role-based access control policy, and attribute-based access control policy, the method including:
  receiving key generation request information;
  generating attribute access policy information on the basis of the key generation request information, the attribute access policy information being an attribute set for encrypting a data key;
  encrypting the data key on the basis of the attribute set for encrypting the data key;
  receiving key acquisition request information;
  on the basis of the attribute set for encrypting the data key, verifying whether attribute information of the key acquisition request information is included in the attribute set for encrypting the data key; and
  in response to the attribute information of the key acquisition request information being included in the attribute set for encrypting the data key, acquiring a destination data key on the basis of the attribute information of the key acquisition request information.

In some embodiments, before the step of generating attribute access policy information on the basis of the key generation request information, the method further includes:
  determining whether the key generation request information is correct according to role information and identity information of a user requesting to generate a key.

In some embodiments, the step of determining whether the key generation request information is correct according to role information and identity information of a user requesting to generate a key includes:
  verifying whether the key generation request information is legal according to the identity information of the user requesting to generate the key and first preset identity information, wherein the first preset identity information is identity information capable of generating the key;
  in response to the key generation request information being legal, determining whether the key generation request information is correct according to the role information of the user requesting to generate the key and first preset role access control information, wherein the first preset role access control information is role authority information capable of generating the key;
  in response to the key generation request information being correct, performing the step of generating the key; and
  in response to the key generation request information being incorrect, not performing the step of generating the key.

In some embodiments, before the step of encrypting the data key on the basis of the attribute set for encrypting the data key, the method further includes:
  creating an access control policy matrix according to the attribute set that allows encryption of the key to be generated;
  generating an initial data key according to the key generation request information; and
  generating a project key according to the key generation request information, wherein in response to the project key existing, the project key is used directly and encrypted with a system root key.

Generating an initial data key according to the key generation request information;
  generating a project key according to the key generation request information, wherein in response to the project key existing, the project key is used directly and encrypted with a system root key; and encrypting the initial data key according to the project key to obtain a first encrypted data key.

In some embodiments, the step of encrypting the data key on the basis of the attribute set for encrypting the data key includes:

converting a character string attribute of the attribute set for encrypting the data key into the access control policy matrix by using a Boolean function; and encrypting the first encrypted data key according to the access control policy matrix to obtain a second encrypted data key.

In some embodiments, the step of on the basis of the attribute set for encrypting the data key, verifying whether attribute information of the key acquisition request information is included in the attribute set for encrypting the data key includes:

verifying whether the key acquisition request information is legal according to the identity information of a user requesting to acquire the key and second preset identity information, wherein the second preset identity information is the identity information capable of acquiring the key;

in response to the key acquisition request information being legal, verifying whether the key acquisition request information is correct according to the role information of the user requesting to acquire the key and second preset role access control information, wherein the second preset role access control information is the role authority information capable of acquiring the key; and in response to the key acquisition request information being correct, verifying whether the attribute information of the key acquisition request information is included in the attribute set for encrypting the data key.

In some embodiments, the step of acquiring a destination data key on the basis of the attribute information of the key acquisition request information includes:

acquiring the second encrypted data key corresponding to the key acquisition request information;

decrypting the second encrypted data key according to the access control policy matrix of the minimum attribute set corresponding to the attribute set for encrypting the data key to obtain the first encrypted data key;

decrypting the encrypted project key corresponding to the first encrypted data key with the system root key to obtain the project key; and decrypting the first encrypted data key according to the project key to obtain the initial data key corresponding to the key acquisition request information, wherein the initial data key is used as the destination data key.

In a second aspect, the embodiments of the present application provide a key management apparatus including:

a data acquisition module, configured to receive key generation request information;

an attribute access policy information generation module, configured to generate attribute access policy information on the basis of the key generation request information, wherein the attribute access policy information is an attribute set for encrypting a data key;

a data key generation module, configured to encrypt the data key on the basis of the attribute set for encrypting the data key;

a data receiving module, configured to receive key acquisition request information;

a verification module, configured to on the basis of the attribute set for encrypting the data key, verify whether the attribute information of the key acquisition request information is included in the attribute set for encrypting the data key; and a key acquisition module configured to, in response to the attribute information of the key acquisition request information being included in the attribute set for encrypting the data key, acquire a destination data key on the basis of the attribute information of the key acquisition request information.

In a third aspect, the embodiments of the present application provide an electronic device, including a memory, a processor, and a computer program stored in the memory and operable on the processor. When the processor executes the computer program stored in the memory, the steps of the above key management method are implemented.

In a fourth aspect, the embodiments of the present application provide a computer-readable storage medium on which a computer program is stored. When the computer program is executed by a processor, the steps of the above key management method are implemented.

In the key management method provided by the embodiments of the present application, receive key generation request information; generate attribute access policy information on the basis of the key generation request information, wherein the attribute access policy information is an attribute set for encrypting a data key; encrypt the data key on the basis of the attribute set for encrypting the data key; receive key acquisition request information; on the basis of the attribute set for encrypting the data key, verify whether attribute information of the key acquisition request information is included in the attribute set for encrypting the data key; and in response to the attribute information of the key acquisition request information being included in the attribute set for encrypting the data key, acquire a destination data key on the basis of the attribute information of the key acquisition request information. By generating a data key according to the key generation request information and the attribute set that allows encryption of the key to be generated, when the key acquisition request information requests to acquire the corresponding key, the key acquisition request information is verified through the attribute set that allows encryption of the key to be generated, so as to implement access control for each key.

Correspondingly, the computer-readable storage medium provided by the embodiments of the present application also has the above-mentioned technical effects.

BRIEF DESCRIPTION OF THE DRAWINGS

In order to more clearly illustrate the technical solutions of the embodiments of the present application or the prior art, the figures that are required to describe the embodiments or the prior art will be briefly introduced below. Apparently, the figures that are described below are embodiments of the present application, and a person skilled in the art can obtain other figures according to these figures without paying creative work.

DETAILED DESCRIPTION

In order to make the objects, the technical solutions and the advantages of the embodiments of the present application clearer, the technical solutions of the embodiments of the present application will be clearly and completely described below with reference to the drawings of the embodiments of the present application. Apparently, the described embodiments are merely certain embodiments of the present application, rather than all of the embodiments. All of the other embodiments that a person skilled in the art obtains on the basis of the embodiments of the present application without paying creative work fall within the protection scope of the present application.

The terms "include", "comprise", "have" and any variations thereof mentioned in the embodiments of the present application are intended to cover non-exclusive inclusion. For example, a process, method, system, product or device comprising a series of steps or units is not limited to the listed steps or units, but alternatively further includes other unlisted steps or units, or alternatively further includes other steps or units inherent to the process, method, product or device.

Figure 1:
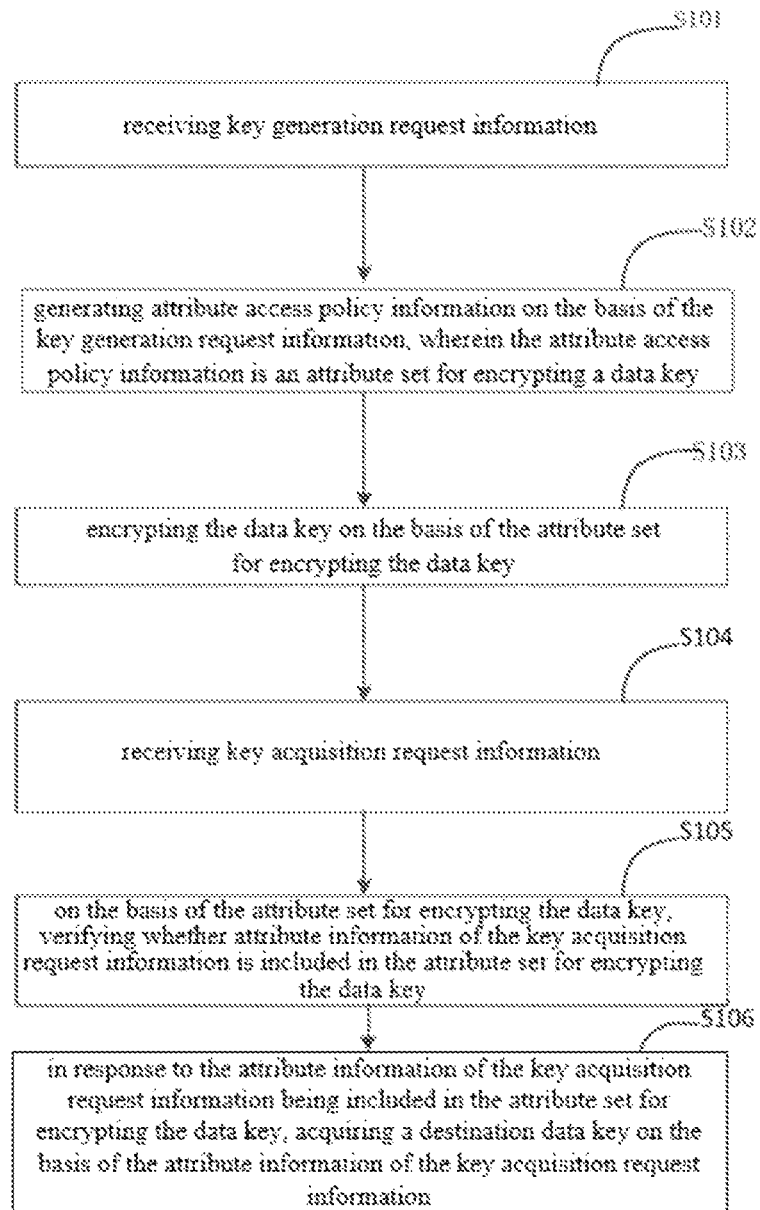
FIG. 1 is a flow chart of a key management method provided by an embodiment of the present application.

By referring to FIG. 1, a key management method provided by the embodiments of this application adopts a three-level access control verification policy; according to the above key management method, a user is subjected to authority verification step by step, including identity verification, role-based access control policy, and attribute-based access control policy, the method including:

S101, receiving key generation request information;

S102, generating attribute access policy information on the basis of the key generation request information, the attribute access policy information being an attribute set for encrypting a data key;

S103, encrypting the data key on the basis of the attribute set for encrypting the data key;

exemplarily, on the basis of a first-level identity verification module and a second-level RBAC-based access control module, the coarse-grained access control on the key to be generated is completed; the key is generated according to the preset attribute access policy information, wherein the attribute access policy information is an attribute set that allows encryption of the key to be generated; a specific user is authorized, and corresponding attributes are set for the corresponding user, so that the specific user has corresponding access authority to the key to be generated, so as to complete fine-grained access control on the key to be generated; exemplarily, the preset attribute access policy information is bound to each key of a key management system.

S104, receiving key acquisition request information;

S105, on the basis of the attribute set for encrypting the data key, verifying whether attribute information of the key acquisition request information is included in the attribute set for encrypting the data key;

exemplarily, in order to distinguish attribute levels, each attribute of the user is classified as either a self-authorization attribute or an authorized attribute; the authorized attribute may only be updated and revoked by the user who created the key; and the self-authorization attribute may be updated and revoked by the user itself.

Exemplarily, when a user creates a key, he may authorize himself to only have attribute information operated by himself, so as to prevent other users from accessing. The other users may also be authorized to only read the attribute information. The user who created the key has the authority to revoke the access attribute authority of the authorized user, and meanwhile, the user who created the key also has the authority to update the attribute access policy in the key management system;

on the basis of the preset attribute access policy information, verify whether the attribute information of the key acquisition request information is included in the attribute access policy information, that is, verify whether the attribute information in the attribute set that allows encryption of the key to be generated when the key is generated according to the key generation request information and the preset attribute access policy information is included in the attribute information of the key acquisition request information.

S106, in response to the attribute information of the key acquisition request information being included in the attribute set for encrypting the data key, acquiring a destination data key on the basis of the attribute information of the key acquisition request information.

Receive key generation request information; generate attribute access policy information on the basis of the key generation request information, wherein the attribute access policy information is an attribute set for encrypting a data key; encrypt the data key on the basis of the attribute set for encrypting the data key; receive key acquisition request information; on the basis of the attribute set for encrypting the data key, verify whether attribute information of the key acquisition request information is included in the attribute set for encrypting the data key; and in response to the attribute information of the key acquisition request information being included in the attribute set for encrypting the data key, acquire a destination data key on the basis of the attribute information of the key acquisition request information. By generating a key according to the key generation request information and the attribute set that allows encryption of the key to be generated, when the key acquisition request information requests to acquire the corresponding key, the key acquisition request information is verified through the attribute set that allows encryption of the key to be generated, so as to implement access control for each key.

In a possible implementation, before the step of generating attribute access policy information on the basis of the key generation request information, the method further includes:

determining whether the key generation request information is correct according to role information and identity information of a user requesting to generate a key.

Exemplarily, verify whether the key generation request information is legal according to the identity information of the user requesting to generate the key and first preset identity information, wherein the first preset identity information is identity information capable of generating the key;

in response to the key generation request information being legal, determine whether the key generation request information is correct according to the role information of the user requesting to generate the key and first preset role access control information, wherein the first preset role access control information is role authority information capable of generating the key;

in response to the key generation request information being correct, perform the step of generating the key; and in response to the key generation request information being incorrect, the step of generating the key is not performed.

Verifying whether the key generation request information is correct according to preset legal information and first preset authority information, ensures that the key generated according to the key generation request information and the preset attribute access policy information is a reasonable key, thereby avoiding that the key is created by malicious access users, which will affect a server and other users.

In a possible implementation, before the step of encrypting the data key on the basis of the attribute set for encrypting the data key, the method further includes:

generating an initial data key according to the key generation request information;

generating a project key according to the key generation request information, wherein in response to the project key existing, it is used directly, and is encrypted with a system root key; and encrypting the initial data key according to the project key to obtain a first encrypted data key.

By completing coarse-grained encryption of the initial data key, the coarse-grained protection of the initial data key is realized.

In a possible implementation, the step of encrypting the data key on the basis of the attribute set for encrypting the data key includes:

converting a character string attribute of the attribute set for encrypting the data key into the access control policy matrix by using a Boolean function; and encrypting the first encrypted data key according to the access control policy matrix to obtain a second encrypted data key.

Exemplarily, by adopting a linear secret sharing scheme to generate the ABE-based access attribute structure policy, and using the Boolean function to realize the automatic conversion of the character string attribute to the linear secret sharing access control policy, the access control policy matrix is generated.

Figure 2:
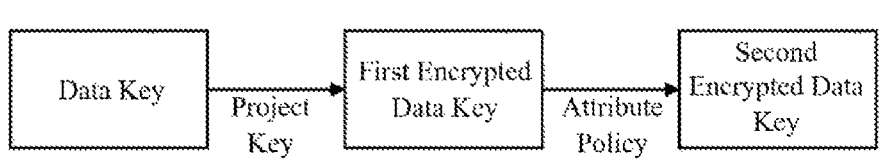
FIG. 2 is a flow chart of a data key encryption process provided by an embodiment of the present application.

Exemplarily, with referring to FIG. 2, the key management system component generates a data key of a corresponding type, and encrypts the data key with the project key to obtain a first encrypted data key. The first encrypted data key is encrypted by using the access control policy matrix to obtain a second encrypted data key. The second encrypted data key is stored, and the data key is returned, wherein the data key is the above key.

In a possible implementation, the step of verifying whether attribute information of the key acquisition request information is included in the attribute set for encrypting the data key on the basis of the attribute set for encrypting the data key includes:

verifying whether the key acquisition request information is legal according to the identity information of the user requesting to acquire the key and second preset identity information, wherein the second preset identity information is the identity information capable of acquiring the key;

in response to the key acquisition request information being legal, verifying whether the key acquisition request information is correct according to the role information of the user requesting to acquire the key and second preset role access control information, wherein the second preset role access control information is the role authority information capable of acquiring the key; and in response to the key acquisition request information being correct, verifying whether the attribute information of the key acquisition request information is included in the attribute set for encrypting the data key.

In response to the attribute information of the request information being included in the attribute access policy information, construct an access control policy matrix of the minimum attribute set.

In a possible implementation, the step of acquiring a destination data key on the basis of the attribute information of the key acquisition request information includes:

acquiring the second encrypted data key corresponding to the key acquisition request information;

decrypting the second encrypted data key according to the access control policy matrix of the minimum attribute set corresponding to the attribute set for encrypting the data key to obtain the first encrypted data key;

decrypting the encrypted project key corresponding to the first encrypted data key with the system root key to obtain the project key; and decrypting the first encrypted data key according to the project key to obtain the initial data key corresponding to the key acquisition request information, wherein the initial data key is used as the destination data key.

Figure 3:
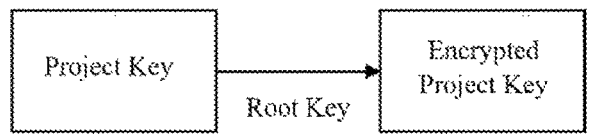
FIG. 3 is a flow chart of a process for generating a project key during data key encryption provided by an embodiment of the present application.

Exemplarily, with referring to FIGS. 2 and 3, the first encrypted data key is recovered from the second encrypted data key by using the linear secret sharing scheme and the access control policy matrix of the minimum attribute set, the encrypted project key corresponding to the key is decrypted with the system root key to obtain the project key, the first encrypted data key is decrypted with the project key to obtain the data key, and the data key is returned to the user.

Figure 4:
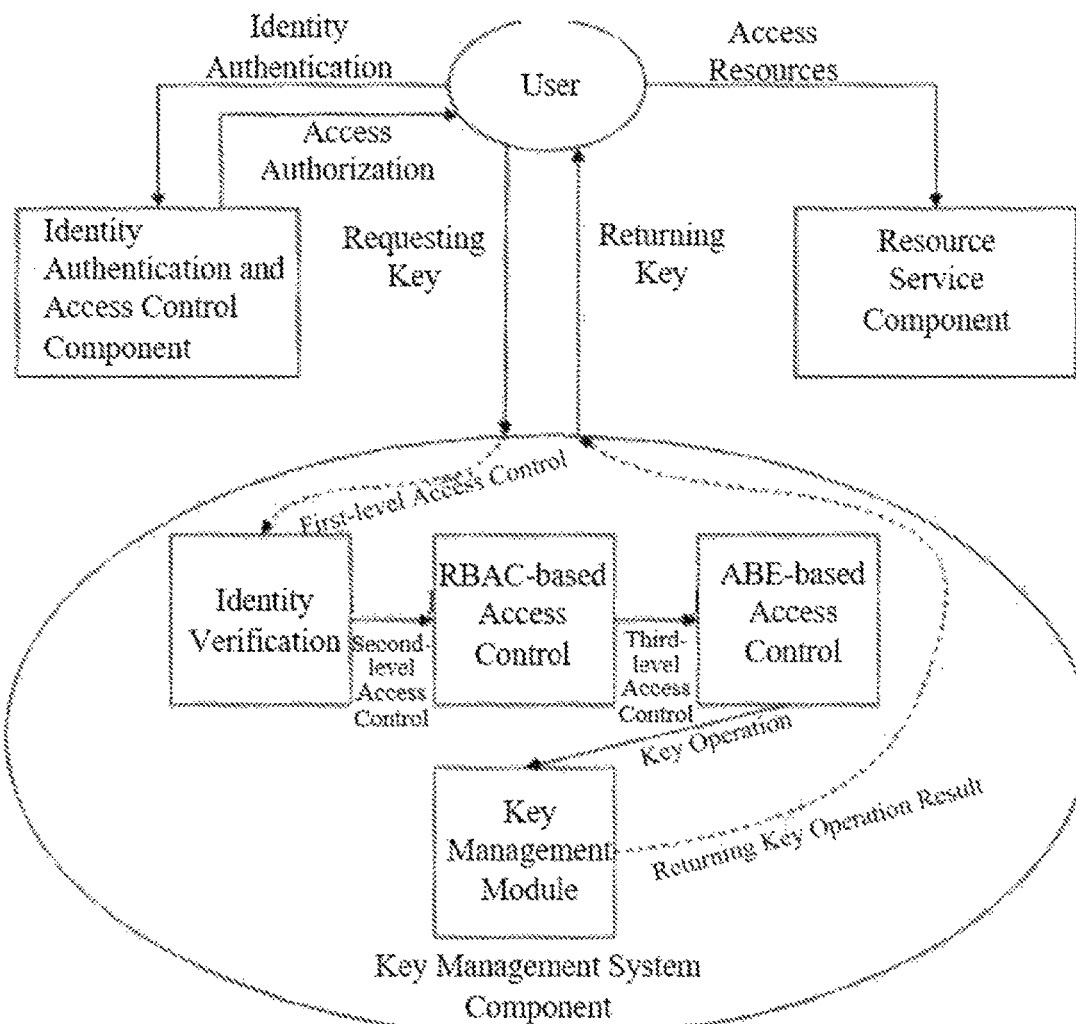
FIG. 4 is a flow chart of the operation of a key management system provided by an embodiment of the present application.

With referring to FIG. 4, the key management system includes an identity authentication and access control component, a key management system component, and a resource service component;

wherein, when a user logs into the system for the first time, the identity authentication and access control component registers the user and assigns it into the corresponding project, and at the same time grants the corresponding role authority. Finally, the identity authentication and access control component verifies the attribute information submitted by the user, verifies and assigns the corresponding user attribute. When a registered user logs into the system, the identity authentication and access control component authenticates the user and authorizes a access token. The user may securely and legally access other components in the cloud computing platform through the access token. The access token specifically includes: a user's role authority, accessible service components, and a user's attribute set.

The key management system component is responsible for the generation, storage and distribution of the key, and provides a key management function for other resource service components in the cloud computing platform. The key management system component includes a first-level identity verification module, a second-level RBAC-based access control module, a third-level ABE-based access control module, and a key management module. The key management system component mainly includes three functions: a three-level access control function when the user accesses the key management component; a key generation and storage function; and a key use function.

The resource service component is used for users to access resources.

The user obtains the authority to call the resource service component through the identity authentication and access control component, obtains a key through the key management system component on the basis of the authority to call the resource service component, and accesses the resource service component according to the key.

When a user needs to access the key management system, he first obtains an authorization token at the identity authentication and access control component. The first-level identity verification module of the key management system verifies the user's authorization token to confirm the legitimacy of the user. Then the second-level RBAC-based access control module performs coarse-grained role authority verification on the user's authorization token to ensure that the user has the authority to access the key management system. Then the third-level ABE-based access control module verifies the attribute of the key that the user wants to access.

Figure 5:
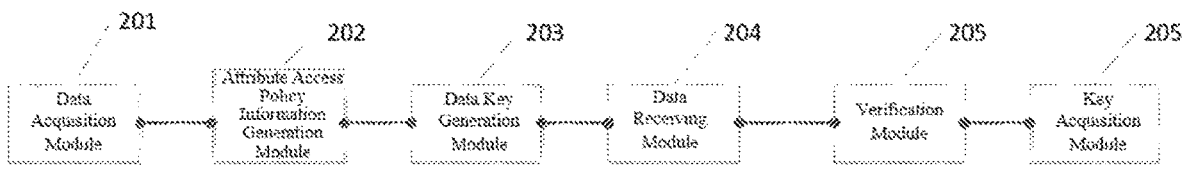
FIG. 5 is a schematic structural diagram of a key management apparatus provided by an embodiment of the present application.

In a possible implementation, with referring to FIG. 5, the embodiments of the present application provide a key management apparatus including:

a data acquisition module 201, configured to receive key generation request information;

an attribute access policy information generation module 202, configured to generate attribute access policy information on the basis of the key generation request information, wherein the attribute access policy information is an attribute set for encrypting a data key;

a data key generation module 203, configured to encrypt the data key on the basis of the attribute set for encrypting the data key;

a data receiving module 204, configured to receive key acquisition request information;

a verification module 205, configured to on the basis of the attribute set for encrypting the data key, verify whether the attribute information of the key acquisition request information is included in the attribute set for encrypting the data key; and a key acquisition module 206 configured to, in response to the attribute information of the key acquisition request information being included in the attribute set for encrypting the data key, acquire a destination data key on the basis of the attribute information of the key acquisition request information.

Figure 6:
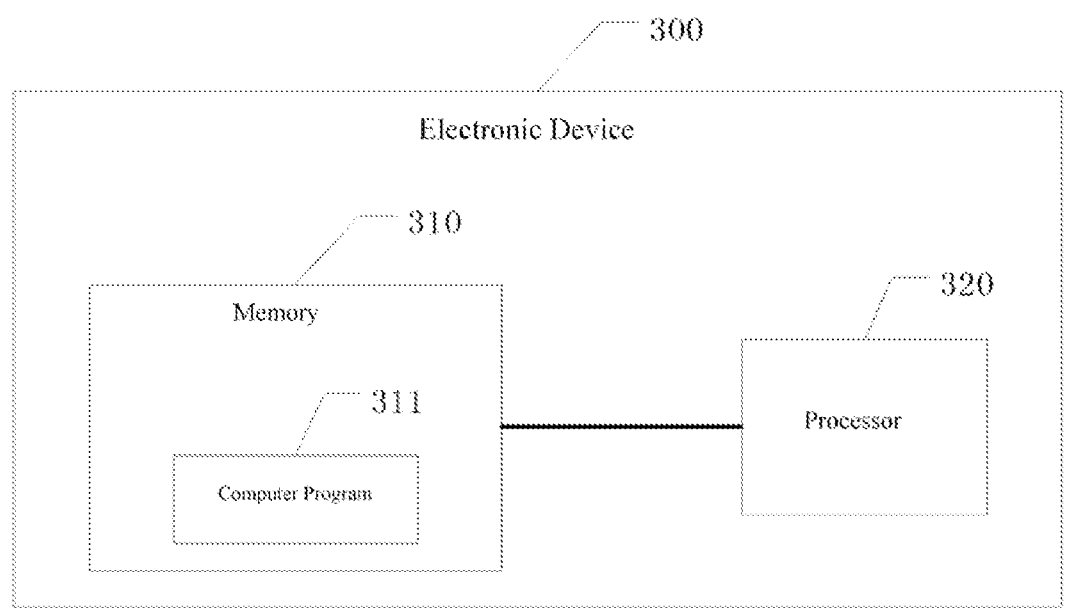
FIG. 6 is a schematic structural diagram of a storage electronic device provided by an embodiment of the present application.

In a possible implementation, with referring to FIG. 6, the embodiments of the present application provide an electronic device, including a memory 310, a processor 320, and a computer program 311 stored in the memory 320 and operable on the processor 320. When the processor 320 executes the computer program 311, the steps of the above key management method are implemented.

Figure 7:
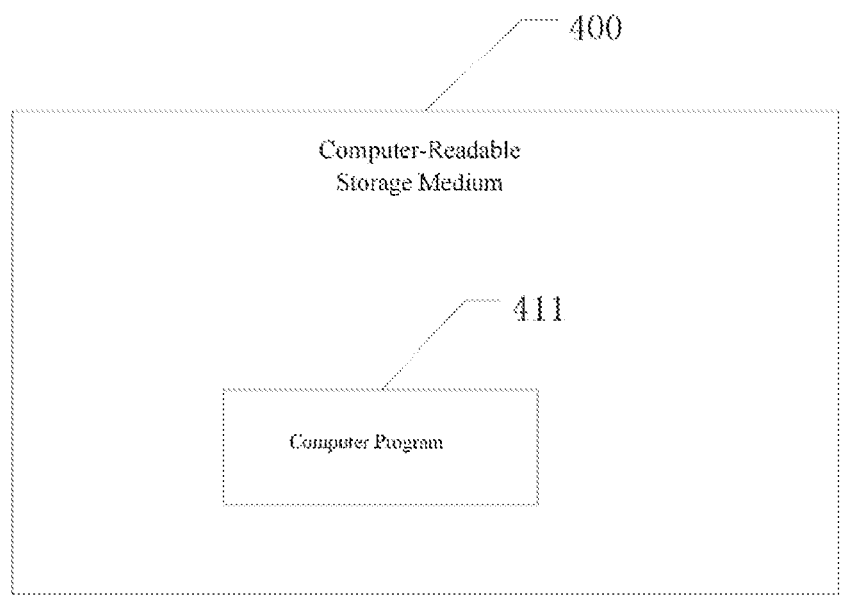
FIG. 7 is a schematic structural diagram of a computer-readable storage medium provided by an embodiment of the present application.

In a possible implementation, with referring to FIG. 7, a computer-readable storage medium 400 is provided, on which a computer program 411 is stored. When the computer program 411 is executed by a processor, the steps of the following key management method are implemented.

In several embodiments provided by the embodiments of the present application, it should be understood that the disclosed apparatus and method may also be implemented in other ways. The apparatus embodiments described above are only illustrative. For example, the flowcharts and block diagrams in the accompanying drawings show the architecture, functions and operations of possible implementations of apparatuses, methods and computer program products according to multiple embodiments in the embodiments of the present application. In this regard, each block in a flowchart or block diagram may represent a module, a program segment, or a part of codes that includes one or more executable instructions for realizing specified logical functions. It should also be noted that, in some alternative implementations, the functions noted in the blocks may occur out of the order noted in the figures. For example, two blocks in succession may, in fact, be executed substantially concurrently, or they may sometimes be executed in the reverse order, depending upon the functionality involved. It should also be noted that each block in the block diagrams and/or flowcharts, and combinations of blocks in the block diagrams and/or flowcharts, can be implemented by a dedicated hardware-based system that performs specified functions or actions, or may be implemented by a combination of dedicated hardware and computer instructions.

For another example, the division of the above units is only a logical function division, and there may another division method in actual implementation. For another example, multiple units or components may be combined or integrated into another system, or some features may be ignored, or not performed. In another point, the mutual coupling or direct coupling or communication connection shown or discussed may be through some communication interfaces, and the indirect coupling or communication connection of apparatuses or units may be in electrical, mechanical or other forms.

The units described above as separate components may or may not be physically separated, and the components shown as units may or may not be physical units, that is, they may be located in one place, or may be distributed to multiple network units. Part or all of the units may be selected according to actual needs to achieve the purpose of the solution of this embodiment.

In addition, various functional units in the embodiments provided by the embodiments of the present application may be integrated into one processing unit, or each unit may exist separately physically, or two or more units may be integrated into one unit.

When the above functions are realized in the form of software functional units and sold or used as an independent product, they may be stored in a computer-readable storage medium. Based on this understanding, the technical solution of the embodiment of the present application is essentially or the part that contributes to the prior art or the part of the technical solution may be embodied in the form of a software product, and the computer software product is stored in a storage medium, including several instructions for enabling a computer device (which may be a personal computer, a server, or a network device, etc.) to execute all or part of the steps of the above-mentioned methods in various embodiments of the embodiments of the present application. The aforementioned storage media include various media capable of storing program codes such as U disk, mobile hard disk, read-only memory (ROM for short), random access memory (RAM for short), magnetic disk or optical disk.

It should be noted that like numerals and letters denote similar items in the following drawings, and therefore, once an item is defined in one drawing, it does not require further definition and explanation in subsequent drawings. In addition, terms "first", "second", "third", etc. are only used for distinguishing descriptions, but should not be construed as indicating or implying relative importance.

Finally, it should be noted that the above-mentioned embodiments are only the specific implementations of the embodiments of the present application, and are used to illustrate the technical solutions of the embodiments of the present application, rather than limiting them. The protection scope of the embodiments of the present application is not limited thereto. Although the embodiments of the present application have been described in detail with reference to the foregoing embodiments, a person skilled in the art should understand that: within the technical scope disclosed in the embodiments of the present application, a person familiar with the technical field can still modify the technical solutions set forth by the foregoing embodiments or can easily think of changes, or make equivalent substitutions to part of the technical features; and these modifications, changes or substitutions do not make the essence of the corresponding technical solutions depart from the scope of the technical solutions of the embodiments of the present application. All should be covered within the scope of protection of the embodiments of the present application. Therefore, the protection scope of the embodiments of the present application should be determined by the protection scope of the claims.

The invention claimed is:

1. A key management method, comprising:
receiving key generation request information;
generating attribute access policy information on the basis of the key generation request information, wherein the attribute access policy information is an attribute set for encrypting a data key;
encrypting the data key on the basis of the attribute set for encrypting the data key;
receiving key acquisition request information;
on the basis of the attribute set for encrypting the data key, verifying whether attribute information of the key acquisition request information is included in the attribute set for encrypting the data key; and
in response to the attribute information of the key acquisition request information being included in the attribute set for encrypting the data key, acquiring a destination data key on the basis of the attribute information of the key acquisition request information;
wherein before the step of encrypting the data key on the basis of the attribute set for encrypting the data key, the method further comprises:
generating an initial data key according to the key generation request information;
generating a project key according to the key generation request information, wherein in response to the project key existing, the project key is used directly and encrypted with a system root key; and
encrypting the initial data key according to the project key to obtain a first encrypted data key.

2. The key management method according to claim 1, wherein before the step of generating attribute access policy information on the basis of the key generation request information, the method further comprises:
determining whether the key generation request information is correct according to role information and identity information of a user requesting to generate a key.

3. The key management method according to claim 2, wherein the step of determining whether the key generation request information is correct according to role information and identity information of a user requesting to generate a key comprises:
verifying whether the key generation request information is legal according to the identity information of the user requesting to generate the key and first preset identity information, wherein the first preset identity information is identity information capable of generating the key;
in response to the key generation request information being legal, determining whether the key generation request information is correct according to the role information of the user requesting to generate the key and first preset role access control information, wherein the first preset role access control information is role authority information capable of generating the key;
in response to the key generation request information being correct, performing the step of generating the key; and
in response to the key generation request information being incorrect, not performing the step of generating the key.

4. The key management method according to claim 1, wherein the step of encrypting the data key on the basis of the attribute set for encrypting the data key comprises:
converting a character string attribute in the attribute set for encrypting the data key into the access control policy matrix by using a Boolean function; and
encrypting the first encrypted data key according to the access control policy matrix to obtain a second encrypted data key.

5. The key management method according to claim 1, wherein the step of on the basis of the attribute set for encrypting the data key, verifying whether attribute information of the key acquisition request information is included in the attribute set for encrypting the data key comprises:
verifying whether the key acquisition request information is legal according to identity information of a user requesting to acquire a key and second preset identity information, wherein the second preset identity information is identity information capable of acquiring the key;
in response to the key acquisition request information being legal, verifying whether the key acquisition request information is correct according to the role information of the user requesting to acquire the key and second preset role access control information, wherein the second preset role access control information is the role authority information capable of acquiring the key; and
in response to the key acquisition request information being correct, verifying whether the attribute information of the key acquisition request information is included in the attribute set for encrypting the data key.

6. The key management method according to claim 4, wherein the step of acquiring a destination data key on the basis of the attribute information of the key acquisition request information comprises:
acquiring the second encrypted data key corresponding to the key acquisition request information;
decrypting the second encrypted data key according to the access control policy matrix corresponding to the minimum attribute set of the attribute set for encrypting the data key to obtain the first encrypted data key;
decrypting the encrypted project key corresponding to the first encrypted data key with the system root key to obtain the project key; and
decrypting the first encrypted data key according to the project key to obtain the initial data key corresponding to the key acquisition request information, wherein the initial data key is used as the destination data key.

7. An electronic device, comprising a memory, a processor, and a computer program stored in the memory and executable on the processor, wherein when the processor executes the computer program stored in the memory, causes the processor to implement operations comprising:

receiving key generation request information;

generating attribute access policy information on the basis of the key generation request information, wherein the attribute access policy information is an attribute set for encrypting a data key;

encrypting the data key on the basis of the attribute set for encrypting the data key;

receiving key acquisition request information;

on the basis of the attribute set for encrypting the data key, verifying whether attribute information of the key acquisition request information is included in the attribute set for encrypting the data key; and in response to the attribute information of the key acquisition request information being included in the attribute set for encrypting the data key, acquiring a destination data key on the basis of the attribute information of the key acquisition request information;

wherein before the operation of encrypting the data key on the basis of the attribute set for encrypting the data key, the method further comprises:

generating an initial data key according to the key generation request information;

generating a project key according to the key generation request information, wherein in response to the project key existing, the project key is used directly and encrypted with a system root key; and encrypting the initial data key according to the project key to obtain a first encrypted data key.

8. A non-transitory computer-readable storage medium, storing a computer program, wherein when the computer program is executed by a processor, causes the processor to implement operations comprising:

receiving key generation request information;

generating attribute access policy information on the basis of the key generation request information, wherein the attribute access policy information is an attribute set for encrypting a data key;

encrypting the data key on the basis of the attribute set for encrypting the data key;

receiving key acquisition request information;

on the basis of the attribute set for encrypting the data key, verifying whether attribute information of the key acquisition request information is included in the attribute set for encrypting the data key; and in response to the attribute information of the key acquisition request information being included in the attribute set for encrypting the data key, acquiring a destination data key on the basis of the attribute information of the key acquisition request information;

wherein before the operation of encrypting the data key on the basis of the attribute set for encrypting the data key, the method further comprises:

generating an initial data key according to the key generation request information;

generating a project key according to the key generation request information, wherein in response to the project key existing, the project key is used directly and encrypted with a system root key; and encrypting the initial data key according to the project key to obtain a first encrypted data key.

9. The key management method according to claim 1, wherein the method further comprises:

on the basis of a first-level identity verification module and a second-level RBAC-based access control module, completing coarse-grained access control on a key to be generated;

generating a key according to preset attribute access policy information, wherein the preset attribute access policy information is an attribute set that allows encryption of the key to be generated;

authorizing a specific user, and setting corresponding attributes for a corresponding user, so that the specific user has corresponding access authority to the key to be generated, to complete fine-grained access control on the key to be generated.

10. The key management method according to claim 9, wherein the preset attribute access policy information is bound to each key of a key management system.

11. The key management method according to claim 1, wherein the method further comprises:

when a user creates a key, authorizing the user to only have attribute information operated by the user, to prevent other users from accessing; or authorizing other users to only read the attribute information;

wherein the user who created the key has the authority to revoke the access attribute authority of an authorized user, and the user who created the key also has the authority to update the attribute access policy in a key management system.

12. The key management method according to claim 4, wherein the step of converting a character string attribute of the attribute set for encrypting the data key into the access control policy matrix by using a Boolean function comprises:

by adopting a linear secret sharing scheme, generating an ABE-based access attribute structure policy; and by using the Boolean function, realizing an automatic conversion of the character string attribute to a linear secret sharing access control policy, and generating the access control policy matrix.

13. The electronic device according to claim 7, wherein before the operation of generating attribute access policy information on the basis of the key generation request information, the method further comprises:

determining whether the key generation request information is correct according to role information and identity information of a user requesting to generate a key.

14. The electronic device according to claim 13, wherein the operation of determining whether the key generation request information is correct according to role information and identity information of a user requesting to generate a key comprises:

verifying whether the key generation request information is legal according to the identity information of the user requesting to generate the key and first preset identity information, wherein the first preset identity information is identity information capable of generating the key;

in response to the key generation request information being legal, determining whether the key generation request information is correct according to the role information of the user requesting to generate the key and first preset role access control information, wherein the first preset role access control information is role authority information capable of generating the key;

in response to the key generation request information being correct, performing the step of generating the key; and in response to the key generation request information being incorrect, not performing the step of generating the key.

15. The electronic device according to claim 7, wherein the operation of encrypting the data key on the basis of the attribute set for encrypting the data key comprises:
converting a character string attribute in the attribute set for encrypting the data key into the access control policy matrix by using a Boolean function; and
encrypting the first encrypted data key according to the access control policy matrix to obtain a second encrypted data key.

16. The non-transitory computer-readable storage medium according to claim 8, wherein before the operation of generating attribute access policy information on the basis of the key generation request information, the method further comprises:
determining whether the key generation request information is correct according to role information and identity information of a user requesting to generate a key.

17. The non-transitory computer-readable storage medium according to claim 16, wherein the operation of determining whether the key generation request information is correct according to role information and identity information of a user requesting to generate a key comprises:
verifying whether the key generation request information is legal according to the identity information of the user requesting to generate the key and first preset identity information, wherein the first preset identity information is identity information capable of generating the key;
in response to the key generation request information being legal, determining whether the key generation request information is correct according to the role information of the user requesting to generate the key and first preset role access control information, wherein the first preset role access control information is role authority information capable of generating the key;
in response to the key generation request information being correct, performing the step of generating the key; and
in response to the key generation request information being incorrect, not performing the step of generating the key.

* * * * *